(12) United States Patent
McBride

(10) Patent No.: US 6,292,899 B1
(45) Date of Patent: Sep. 18, 2001

(54) VOLATILE KEY APPARATUS FOR SAFEGUARDING CONFIDENTIAL DATA STORED IN A COMPUTER SYSTEM MEMORY

(76) Inventor: Randall C. McBride, 7331 County Rd. 1, Montrose, CO (US) 81401

( * ) Notice: Subject to any disclaimer, the term of this patent is extended or adjusted under 35 U.S.C. 154(b) by 0 days.

(21) Appl. No.: 09/159,069

(22) Filed: Sep. 23, 1998

(51) Int. Cl.⁷ .................................................... G06F 12/14
(52) U.S. Cl. ..................... 713/200; 713/185; 713/165; 713/193; 713/194; 713/201; 380/281; 380/284
(58) Field of Search .................................... 713/194, 185, 713/200, 165, 193, 201; 380/281, 284

(56) References Cited

U.S. PATENT DOCUMENTS

| | | | |
|---|---|---|---|
| 5,117,457 | * 5/1992 | Comerford et al. | 380/3 |
| 5,353,350 | * 10/1994 | Unsworth et al. | 380/3 |
| 5,515,540 | 5/1996 | Grider et al. | |
| 5,675,645 | 10/1997 | Schwartz et al. | |

FOREIGN PATENT DOCUMENTS 0 583 140 A1   2/1994   (EP).

OTHER PUBLICATIONS

Applied Crytography (Schneier, Oct. 18, 1995, pp. 184, 224, 561–562).*

* cited by examiner

Primary Examiner—Tod Swann
Assistant Examiner—Paul E. Callahan
(74) Attorney, Agent, or Firm—Duft, Graziano & Forest, P.C.

(57) ABSTRACT

The data security system uses a volatile key apparatus to create and manage a master file, comprising a single encrypted file that is stored on the hard drive of the computer system. The master file contains all of the passwords, cryptokeys and security codes that are used by conventional security programs and apparatus resident on the computer system to safeguard the confidential data that is contained in the memory of the computer system. The master key that is used to encrypt and decrypt this master file is stored in the volatile key apparatus, which is a piece of hardware located in the personal computer and directly connected to the system bus. When a violation of the system security procedures is detected, the master key is erased from the volatile key apparatus, thereby preventing access to the encrypted information that is stored on the hard drive. The encryption protected data can still be retrieved from the hard drive by the authorized user reinstalling the master key in the volatile key apparatus, thereby enabling decryption of the encrypted passwords, cryptokeys and security codes that are stored in the master file. The conventional security programs and apparatus resident on the computer system can then use the contents of the master file to retrieve the encrypted data from the memory.

18 Claims, 4 Drawing Sheets

VOLATILE KEY APPARATUS FOR SAFEGUARDING CONFIDENTIAL DATA STORED IN A COMPUTER SYSTEM MEMORY

FIELD OF THE INVENTION

This invention relates to computer systems and, in particular, to a volatile key apparatus that creates an encrypted master file to securely store all of the passwords, security codes and cryptokeys that are used to safeguard the contents of a computer memory.

It is a problem in the field of computer systems to provide an effective manner of safeguarding the integrity of data that is stored in memory. In most computer and data storage systems, the privacy of computer data can be compromised without undue effort due to a lack of security measures installed on such systems. In computer systems that implement data security, the users typically find the data security systems either burdensome to use or largely ineffective in their operation.

In the field of personal computer systems, the data that is stored thereon is typically intended to remain private to the particular user who creates the data. This data can comprise medical, financial, legal, political and personal information that the user has collected and stored in a conveniently accessible manner by writing into the memory of the personal computer. The security of this information can be ensured to a certain degree by the use of computer passwords, which prevent an unauthorized user from activating the computer system. The password system prevents the system from booting and therefore prevents the unauthorized user from being able to access the data that is stored on the hard drive. However, this password system can be thwarted in a number of ways. The unauthorized user can boot the system from a floppy disk thereby bypassing the password protection. Alternatively, the unauthorized user can remove the hard drive and install it on a personal computer that is not password protected. A third mode of attack comprises the use of a brute force attack where the unauthorized user submits a series of likely passwords until a password match is attained. The number of passwords submitted can be large, and if the password system is of limited capability, such an attack can be effective.

An alternative method of data security is obtained by the use of cryptosystems, wherein the stored data is encrypted using a user provided cryptokey. The use of cryptography is commonly used in the transmission of secure data over a non-secure transmission medium, such as the telephone lines, or over the Internet. When the data stored on a personal computer memory is encrypted, the cryptokey is typically also stored on the same memory, thereby subjecting the cryptokey system to being by comprised. This can be accomplished by obtaining access to the personal computer and subjecting the cryptokey system to a brute force attack by the submission of a large number of cryptokeys.

A further dimension to the problem is that the users have an ever increasing number of passwords and cryptokeys to remember. Users typically write down the passwords and cryptokeys, thereby compromising the effectiveness of the security system. The basic encryption system also requires that specific information, such as the encryption key be available for use by the security system. The encryption key can be stored on removable media to increase security, but loading the security key floppy can be a nuisance, thereby reducing the probability that the user will maintain the system. The user is likely to store the data on the hard disk for convenience or leave the floppy disk in a readily accessible area.

U.S. Pat. No. 5,515,540 discloses a microprocessor that has improved security against tampering, including attempts at active tampering. A battery backed microcontroller includes encryption and power management functions, and is combined with a battery and a volatile semiconductor memory. The microcontroller supplies power to the semiconductor memory. When a security violation is detected, the microcontroller wipes its encryption registers and grounds the power output pin to the memory. This operation destroys all of the data that is stored in the memory. Unfortunately, this system cannot simply recover from a security violation, since all of the data is erased.

The above described problems are solved and a technical advance achieved by the present data security system which uses a volatile key apparatus to create and manage a master file, comprising a single encrypted file that is stored on the hard drive of the computer system. The master file contains all of the passwords, cryptokeys and security codes that are used by conventional security programs and apparatus resident on the computer system to safeguard the confidential data that is contained in the memory of the computer system. The master key that is used to encrypt and decrypt this master file is stored in the volatile key apparatus, which is a piece of hardware located in the personal computer and directly connected to the system bus. When a violation of the system security procedures is detected, the master key is erased from the volatile key apparatus, thereby preventing access to the encrypted information that is stored on the hard drive. The encryption protected data can still be retrieved from the hard drive by the authorized user reinstalling the master key in the volatile key apparatus, thereby enabling decryption of the encrypted passwords, cryptokeys and security codes that are stored in the master file. The conventional security programs and apparatus resident on the computer system can then use the contents of the master file to retrieve the encrypted data from the memory.

The present data security system can be activated by a security violation that is detected by ancillary equipment, such as that disclosed in U.S. Pat. No. 5,675,321, or in response to a brute force attack on the password system. The present data security system can be integrated with such ancillary equipment or can represent a separate security system. In either case, by combining an effective software cryptosystem, such as PGP Cryptosystem, with the volatile key apparatus, a high level of data security for the confidential data stored on the computer system memory can be attained.

DETAILED DESCRIPTION

Figure 1:
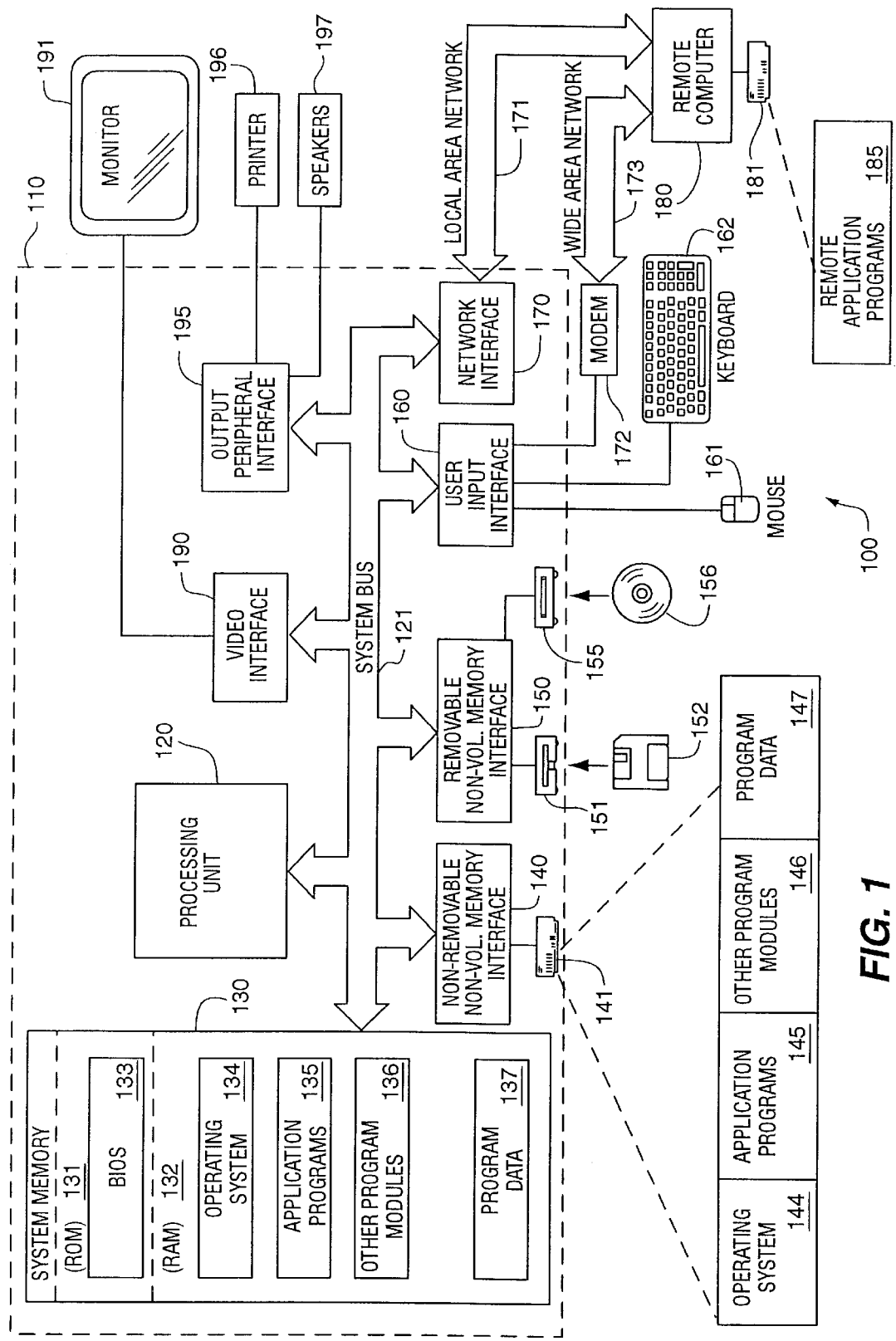
FIG. 1 illustrates in block diagram form the basic architecture of a typical computer system that is used to implement the present data security system.

FIG. 1 illustrates in block diagram form the basic architecture of a typical computer system that is used to implement the present data security system. FIG. 1 and the following discussion are intended to provide a brief, general description of a suitable computing environment in which the invention may be implemented. Those skilled in the art will appreciate that the invention may be practiced with other computer system configurations, including hand-held devices, multi-processor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 100, which comprises a processing module 110, including a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. The system memory 130 includes read only memory (ROM) 131 and random access memory (RAM) 132. A basic input/output system 133 (BIOS), containing the basic routines that helps to transfer information between elements within the personal computer 100, such as during start-up, is stored in ROM 131. The personal computer 100 further includes a hard disk drive 140 for reading from and writing to a hard disk, a magnetic disk drive 151 for reading from or writing to a removable magnetic disk 152, and an optical disk drive 155 for reading from or writing to a removable optical disk 156 such as a CD ROM or other optical media. The hard disk drive 141, magnetic disk drive 151, and optical disk drive 155 are connected to the system bus 121 by a hard disk drive interface 140, a magnetic disk drive interface 150, and an optical drive interface 155, respectively. The drives and their associated computer-readable media provide nonvolatile storage of the operating system 144, application programs 145, other program modules 146 and other program data 147 for the personal computer 100. Although the exemplary environment described herein employs a hard disk, a removable magnetic disk 152 and a removable optical disk 156, it should be appreciated by those skilled in the art that other types of computer readable media which can store data that is accessible by a computer, such as magnetic cassettes, flash memory cards, digital video disks, Bernoulli cartridge, random access memories (RAMs), read only memories (ROM), and the like, may also be used in the exemplary operating environment. A number of program modules may be stored on the hard disk, magnetic disk 152, optical disk 156, ROM 131 or as shown in RAM 132, including an operating system 134, one or more application programs 135, other program modules 136, and program data 137. A user may enter commands and information into the personal computer 100 through input devices such as a keyboard 162 and pointing device 161. Other input devices (not shown) may include a microphone, joystick, game pad, satellite dish, scanner, or the like. These and other input devices are often connected to the processing unit 120 through a serial port interface 160 that is coupled to the system bus 121, but may be connected by other interfaces, such as a parallel port, game port or a universal serial bus (USB). A monitor 191 or other type of display device is also connected to the system bus 121 via an interface, such as a video adapter 190. In addition to the monitor 191, personal computers 100 typically include other peripheral output devices, such as speakers 197 and printers 196. The personal computer 100 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 100.

The logical connections depicted in FIG. 1 include a local area network (LAN) 171 and a wide area network (WAN) 173. Such networking environments are commonplace in offices, enterprise-wide computer networks, intranets and the Internet.

When used in a LAN networking environment, the personal computer 100 is connected to the local network 171 through a network interface or adapter 170.

When used in a WAN networking environment, the personal computer 100 typically includes a modem 172 or other means for establishing communications over the wide area network 173, such as the Internet. The modem 172, which may be internal or external, is connected to the system bus 121 via the serial port interface 160. In a networked environment, program modules depicted relative to the personal computer 100, or portions thereof, may be stored in the remote memory storage device 185. It will be appreciated that the network connections shown are exemplary and other means of establishing a communications link between the computers may be used.

Security System Architecture

Figure 2:
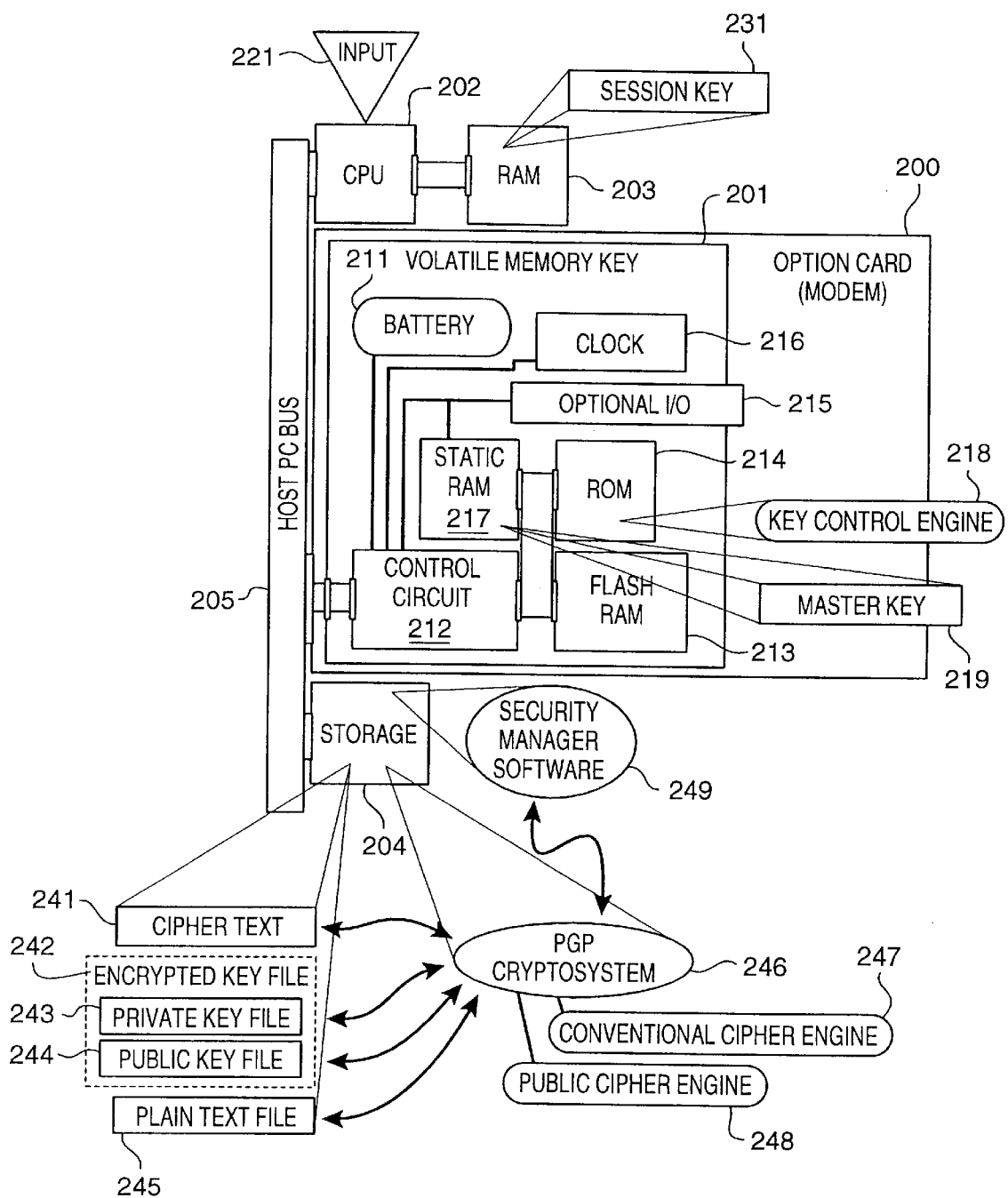
FIG. 2 illustrates in block diagram form the architecture of the present data security system as implemented in a personal computer system, such as that shown in FIG. 1.
Figure 3:
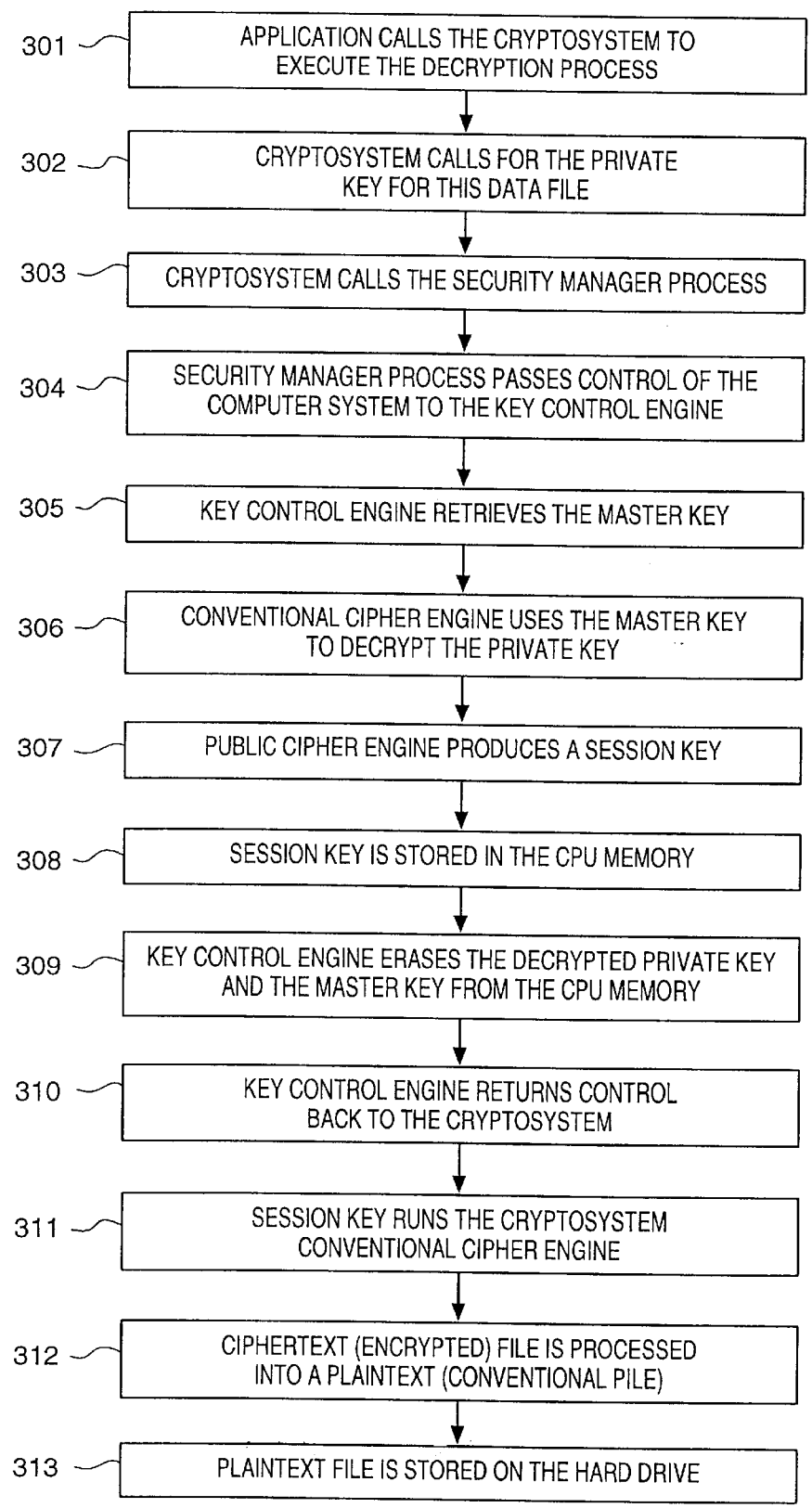
FIGS. 3 and 4 illustrate in flow diagram form the operation of the present data security system to decrypt an encrypted file using the master key.
Figure 4:
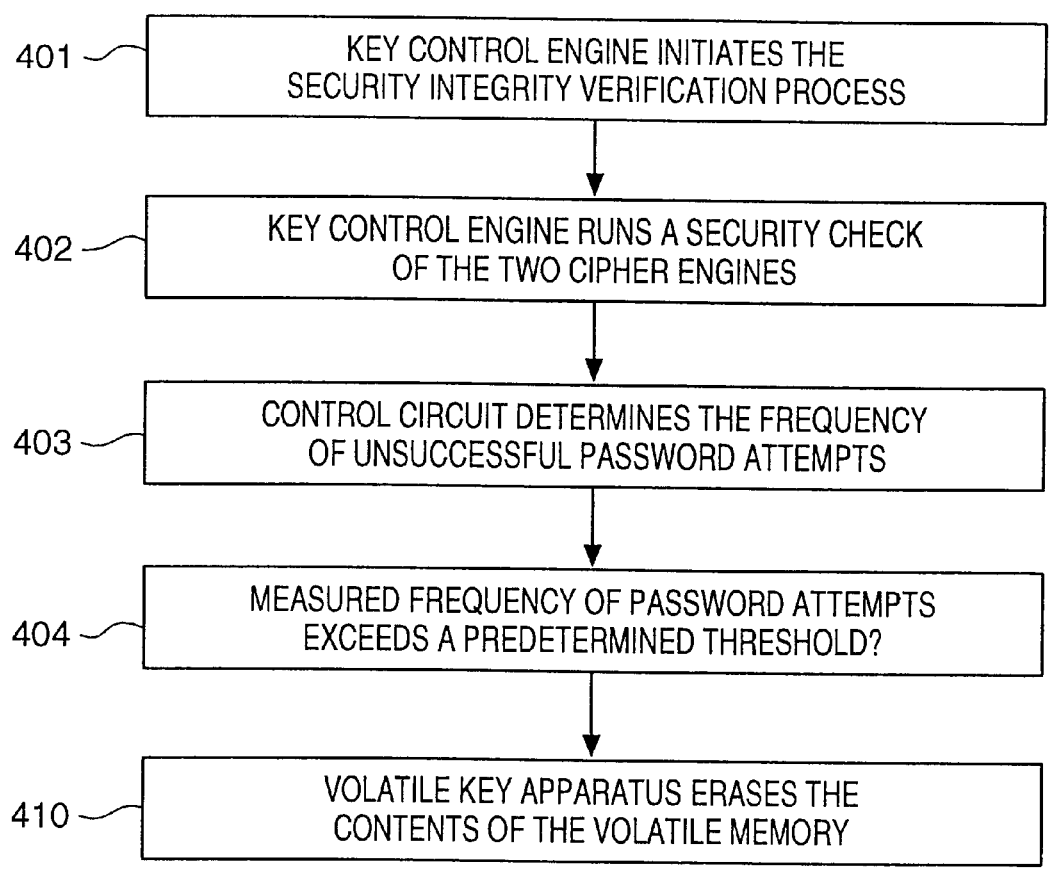

FIG. 2 illustrates in block diagram form the architecture of the present data security system 200 as implemented in a personal computer system, of the type shown in FIG. 1, and FIGS. 3 and 4 illustrate in flow diagram form the operation of the present data security system 200 to decrypt an encrypted file using the master key.

In a computer system, the information stored thereon can be segmented into discrete categories: application programs, non-critical application data, critical application data. The application programs represent the typical commercially available word processing, communications and database programs that do not warrant any degree of security protection, since they are commodity elements that can easily be replaced. Likewise, there is a large volume of computer data that is generated pursuant to the use of the application program that represents noncritical data, whose retrieval by an unauthorized party would not represent a significant security breach. However, the last class of data comprises the sensitive, user-specific information, such as medical, financial, legal, political and personal information that the user has collected and stored in the memory of the computer system. This critical data, whether formatted for transmission or simply for storage in the personal computer system memory, should be safeguarded using an effective data security system.

The present data security system 200 enables the computer system to encrypt and decrypt these critical files using a cryptosystem, such as the commercially available PGP Cryptosystem 246 that is stored in memory 204 and that executes on CPU 202 while safeguarding the cryptokeys used by this cryptosystem 246. In the traditional cryptosystem operation, the PGP Cryptosystem 246 encrypts and decrypts data files using two separate cipher engines 247, 248 to maximize both security and efficiency. One cipher engine, conventional cipher engine 247, comprises a fast process that uses a single key to both encrypt and decrypt the data. The problem with using the conventional cipher engine 247 is that the single key is difficult to secure in terms of its transmission between sender and receiver. To overcome this problem, a second cipher engine, public cipher engine 248, is used to implement a public key cipher function wherein the sender uses a publicly known key to send a message that can only be read with the recipient's private key. The two cipher engines 247, 248 operate together and include a process that is invisible to the user that creates a temporary random single cryptokey for each "session" to encrypt the plain text file using the conventional cipher engine. The recipient's public key is used to encrypt this temporary cryptokey (session key 231). The public key encrypted session key 231 is then transmitted along with the cipher text to the recipient. The recipient uses their private cryptokey to recover the session key 231 and then uses that single key to run the fast conventional cipher engine 247 to decrypt the ciphertext message. Thus, the public cipher engine 248 is only used to securely send the session key 231. The problem with this system is that the cryptosystem 246 must maintain the private key under the recipient's physical control for the system to be operational. The need for physical control means that the private key is stored on the hard drive 204 for convenience and may only be protected from unauthorized access by means of a password, if such a function is even used. The passwords are typically stored in Flash RAM 213.

The present data security system 200 provides an additional level of security to this cryptokey system by safeguarding the private key that is stored in the memory 204 of the personal computer system. This is accomplished by the storage of the passwords, access codes and cryptokeys that are used by the conventional security programs and apparatus resident on the computer system in encrypted form in the memory 204 in a master file 242. This renders this security information unusable to the unauthorized user without the availability of the master key to decrypt these stored passwords, access codes and cryptokeys.

Operation of the Security System

When an application must decrypt a data file, access code, password, or cryptokey (collectively termed "data file" herein for simplicity) that is stored in memory 204 in encrypted form, the application at step 301 calls the cryptosystem 246 to execute the decryption process. The cryptosystem 246 begins the decryption process by calling for the private key 243 for this data file at step 302. The private key is located in the master file 242 in memory 204 and is retrieved by the cryptosystem 246 calling the security manager process 249 at step 303. The security manager process 249 passes control of the computer system to the key control engine 218 at step 304 to generate the required session key 231 to enable the decryption process to continue. This is accomplished when the key control engine 218 retrieves the master key 219 from the static RAM 217 to the CPU 202 at step 305, where the conventional cipher engine 247 executes and uses the master key 219 to decrypt the private key at step 306. The decrypted private key is then used by the public cipher engine 248 to produce a session key 231 at step 307. The session key 231 is stored in the CPU memory 203 at step 308 while the key control engine 218 erases the decrypted private key and the master key from the CPU memory 203 at step 309 before returning control back to the cryptosystem 246 at step 310. This session key 231 runs the cryptosystem conventional cipher engine 247 at step 311 using the CPU 202. The ciphertext (encrypted) file 241 is processed at step 312 into a plaintext (conventional file) 245 which is stored on the hard drive 204 at step 313.

Security Integrity Verification

Within the volatile key apparatus 201 are specific instructions, termed the "key control engine" that are stored on a read only memory 214. When the security manager 249 passes control to the key control engine 218 at step 304, the security integrity verification process is executed by the key control engine 218. The key control engine 218 at step 401 initiates the security integrity verification process, which typically comprises a plurality of checks to ensure that the security of the computer system has not been breached.

One method of tamper deterrence is the generation of a checksum on the PGP Cipher engines 247, 248. Thus, all of the sensitive encryption instruction codes are maintained in a single file, with the generated checksum being usable to detect alteration of the file contents. The checksum result is stored in the volatile memory 217 with the master key. Thus, at step 402, the key control engine 218 runs a security check of the two cipher engines 247, 248 that comprises the cryptosystem 246 that runs on CPU 202. The key control engine 218 runs a checksum on both the cipher engines 247, 248 and the lock out instructions to ensure that neither has been tampered with. If a security violation is detected, then processing advances to step 410 as described below.

The control circuit 212 also maintains a record of all password attempts and their frequency. An internal clock 216 is used to track the elapsed time between attempted accesses to the password Flash RAM 213. Passwords that are submitted by a user are matched by the control circuit 212 and are unavailable to the CPU 202. Therefore, the CPU 202 cannot be used to compromise the operation of the control circuit 212 and the contents of the Flash RAM 213 and ROM 214. The control circuit 212 at step 403 determines the frequency of unsuccessful password attempts and at step 404, if the measured frequency exceeds a predetermined threshold, then a security violation is detected, and processing advances to step 410 as described below. If there is no indication of tampering, the master key is passed to the CPU at step 305 and used in the conventional cipher engine to produce the decrypted access code.

In the event that the computer system or volatile key apparatus 201 determines a violation of security, such as a brute force attack, at step 410 the volatile key apparatus 201 erases the contents of the volatile memory 217 thereby eliminating the master key 219 as well as the checksum.

Without the master key 219, to decrypt the private key 243, a session key 231 cannot be produced and without the session key 231, the ciphertext 241 can not be decrypted. The authorized user can restore the master key 219, in the volatile key apparatus 201 of the personal computer from a copy of the master key which has been maintained in a disparate secure location, such as a safe deposit box. The volatile key apparatus 201 can be initialized using interface software 221 that function as an application program on the personal computer. The volatile key apparatus 201 is typically seeded with a stock password, such as "11 . . . 11" and the user can then program in their own personally selected password. Using the stock password key, the user can access the volatile key apparatus 201 and create a master key. The master key can then be copied and placed in safe keeping in a location disparate from the personal computer. The created passwords are stored in Flash RAM 213.

A further deterrent is the use of the data security system 201 which signals the control circuit 212 via dedicated signal conductors and the I/O port of the control circuit 212. The received signals are used to determine whether physical tampering of the personal computer has occurred. Even if the contents of the volatile memory 217 are erased, the information stored therein can be reloaded by the user providing the master key 219. The power provided to operate the control circuit 212 and the volatile memory 217 are provided by a separate battery 211 that is used to power these circuit elements.

The data security system uses a volatile key apparatus to create and manage a master file, comprising a single encrypted file that contains all of the passwords, cryptokeys and security codes that are used by conventional security programs and apparatus resident on the computer system to safeguard the confidential data that is contained in the memory of the computer system. The master key that is used to encrypt and decrypt this master file is stored in the volatile key apparatus, which is a piece of hardware located in the personal computer and directly connected to the system bus. When a violation of the system security procedures is detected, the master key is erased from the volatile key apparatus, thereby preventing access to the encrypted information that is stored on the hard drive.

What is claimed:

1. A data security system resident in a computer system for preventing unauthorized access to at least one encrypted data file stored in a memory of said computer system, comprising:

means for encrypting a private key associated with an encrypted data file and that is used to decrypt said encrypted data file, using a master key;

means for storing said encrypted private key;

volatile memory means for storing said master key;

means, responsive to a request to decrypt said encrypted data file, for generating said private key from said encrypted private key using said master key;

means for detecting a security violation; and means, responsive to a detected security violation, for automatically erasing said master key from said volatile memory means.

2. The data security system of claim 1 wherein said means for detecting a security violation comprises:

means for detecting an attempt at unauthorized access to said encrypted data file.

3. The data security system of claim 1 wherein said means for detecting a security violation comprises:

means for detecting an anomaly in said means for encrypting.

4. The data security system of claim 1 wherein said means for generating comprises:

means for decrypting said private key from said encrypted private key;

key control means for regulating generation of said private key;

security manager means, responsive to said request to decrypt said encrypted data file, for switching control of a processor in said computer system to said key control means; and wherein said key control means is responsive to receipt of control of said processor for transmitting said master key to said means for decrypting to produce said private key.

5. The data security system of claim 4 wherein said key control means is responsive to generation of said private key for erasing said master key from said processor.

6. The data security system of claim 1 further comprising:

means, responsive to said means for erasing having removed said master key from said volatile memory means, for enabling an authorized user to rewrite said master key into said volatile memory means.

7. A method of operating a data security system that is resident in a computer system to prevent unauthorized access to at least one encrypted data file stored in a memory of said computer system, comprising the steps of:

encrypting a private key associated with an encrypted data file and that is used to decrypt said encrypted data file, using a master key;

storing said encrypted private key in a master file memory;

storing said master key in a volatile memory;

generating, in response to a request to decrypt said encrypted data file, said private key from said encrypted private key using said master key;

detecting a security violation; and erasing, in response to a detected security violation, said master key from said volatile memory.

8. The method of operating a data security system of claim 7 wherein said step of detecting a security violation comprises:

detecting an attempt at unauthorized access to said encrypted data file.

9. The method of operating a data security system of claim 7 wherein said step of detecting a security violation comprises:

detecting an anomaly in said step of encrypting.

10. The method of operating a data security system of claim 7 wherein said step of generating comprises:

decrypting in a cipher engine said private key from said encrypted private key;

regulating generation of said private key;

switching control of a processor in said computer system to said key control means in response to said request to decrypt said encrypted data file; and wherein said step of regulating generation is responsive to receipt of control of said processor for transmitting said master key to said cipher engine to produce said private key.

11. The method of operating a data security system of claim 10 wherein said step of regulating generation is responsive to generation of said private key for erasing said master key from said processor.

12. The method of operating a data security system of claim 7 further comprising the step of:

enabling, in response to said step of erasing having removed said master key from said volatile memory, an authorized user to rewrite said master key into said volatile memory.

13. A data security system resident in a computer system for preventing unauthorized access to encrypted data file stored in a memory of said computer system, comprising:

cipher engine means for encrypting a data file using a private key that is also capable of decrypting said data file;

means for storing said encrypted data file;

means for encrypting said private key using a master key;

means for storing said encrypted private key in a master file memory;

volatile memory means for storing said master key;

means, responsive to a request to decrypt said encrypted data file, for generating said private key from said encrypted private key stored in said master file memory using said master key;

means for detecting a security violation; and means, responsive to a detected security violation, for erasing said master key from said volatile memory means.

14. The data security system of claim 13 wherein said means for generating comprises:

means for decrypting said private key from said encrypted private key;

key control means for regulating generation of said private key;

security manager means, responsive to said request to decrypt said encrypted data file, for switching control of a processor in said computer system to said key control means; and wherein said key control means is responsive to receipt of control of said processor for transmitting said master key to said means for decrypting to produce said private key.

15. The data security system of claim 14 wherein said key control means is responsive to generation of said private key for erasing said master key from said processor.

16. A method of operating a data security system that is resident in a computer system for preventing unauthorized access to encrypted data file stored in a memory of said computer system, comprising the steps of:

encrypting, in a cipher engine, a data file using a private key that is also capable of decrypting said data file;

storing said encrypted data file;

encrypting said private key using a master key;

storing said encrypted private key in a master file memory;

storing said master key in a volatile memory;

generating, in response to a request to decrypt said encrypted data file, said private key from said encrypted private key stored in said master file memory using said master key;

detecting a security violation; and erasing, in response to a detected security violation, said master key from said volatile memory.

17. The method of operating a data security system of claim 16 wherein said step of generating comprises:

decrypting said private key from said encrypted private key;

regulating generation of said private key;

switching, in response to said request to decrypt said encrypted data file, control of a processor in said computer system to said step of regulating generation; and wherein said step of regulating generation is responsive to receipt of control of said processor for transmitting said master key to said cipher engine to produce said private key.

18. The method of operating a data security system of claim 17 wherein said step of regulating generation is responsive to generation of said private key for erasing said master key from said processor.

* * * * *